United States Patent
Nozaki

(10) Patent No.: US 12,538,199 B2
(45) Date of Patent: Jan. 27, 2026

(54) CONTROL DEVICE, COMPUTER READABLE STORAGE MEDIUM, SYSTEM, AND CONTROL METHOD

(71) Applicant: SoftBank Corp., Tokyo (JP)

(72) Inventor: Kiyoshi Nozaki, Tokyo (JP)

(73) Assignee: SoftBank Corp., Tokyo (JP)

( * ) Notice: Subject to any disclaimer, the term of this patent is extended or adjusted under 35 U.S.C. 154(b) by 315 days.

(21) Appl. No.: 18/341,763

(22) Filed: Jun. 27, 2023

(65) Prior Publication Data
US 2023/0345330 A1    Oct. 26, 2023

Related U.S. Application Data

(63) Continuation of application No. PCT/JP2022/000287, filed on Jan. 6, 2022.

(30) Foreign Application Priority Data

Jan. 13, 2021  (JP) .................................. 2021-003538

(51) Int. Cl.
*H04W 36/00*   (2009.01)
*H04W 36/08*   (2009.01)
*H04W 84/00*   (2009.01)

(52) U.S. Cl.
CPC ... *H04W 36/083* (2023.05); *H04W 36/00833* (2023.05); *H04W 84/00* (2013.01)

(58) Field of Classification Search
CPC . H04W 84/005; H04W 84/06; H04W 36/083; H04W 36/00833; H04B 7/18504; H04B 7/18502

See application file for complete search history.

(56) References Cited

U.S. PATENT DOCUMENTS 10,034,209 B1    7/2018  Nandan
11,949,491 B2 *  4/2024  Babich ...................... H04L 1/08
(Continued)

FOREIGN PATENT DOCUMENTS

JP    2015525540 A    9/2015
JP    2017521962 A    8/2017
(Continued)

OTHER PUBLICATIONS

Extended European Search Report for counterpart European Application No. 22739331.1, issued by the European Patent Office on Jun. 6, 2024.
(Continued)

*Primary Examiner* — Shukri Taha

(57) ABSTRACT

Provided is a control device which controls a flight vehicle which forms a multi-cell including a plurality of cells on a ground to provide a wireless communication service to user terminals in the multi-cell, the control device including an output control unit which performs control such that in response to a state where a second flight vehicle which is to replace a first flight vehicle controlled by the control device has started forming a plurality of cells to be aligned with a position of each of the plurality of cells formed by the first flight vehicle, each of the plurality of cells formed by the second flight vehicle being in a same frequency band as that of each of the plurality of cells formed by the first flight vehicle, radio wave output of the plurality of cells of the first flight vehicle continuously falls.

19 Claims, 11 Drawing Sheets

(56) References Cited

U.S. PATENT DOCUMENTS

| | | | |
|---|---|---|---|
| 12,149,958 B2* | 11/2024 | Iwamura | ................ B64U 10/25 |
| 2013/0337822 A1 | 12/2013 | Rubin | |
| 2016/0174121 A1 | 6/2016 | Rubin | |
| 2017/0208512 A1* | 7/2017 | Aydin | .................. G05D 1/0022 |
| 2020/0229206 A1* | 7/2020 | Badic | ..................... G05D 1/225 |
| 2020/0245175 A1* | 7/2020 | Zhang | ................... H04W 76/27 |
| 2021/0064063 A1* | 3/2021 | Wakikawa | .............. B60L 50/60 |
| 2021/0091848 A1 | 3/2021 | Cai | |
| 2021/0203408 A1 | 7/2021 | Hirai | |
| 2022/0022119 A1 | 1/2022 | Sai | |

FOREIGN PATENT DOCUMENTS

| | | | |
|---|---|---|---|
| JP | 2020036059 A | 3/2020 | |
| JP | 2020043494 A | 3/2020 | |
| JP | 2020048046 A | 3/2020 | |
| JP | 2020170888 A | 10/2020 | |
| WO | WO-2020054237 A1 * | 3/2020 | .......... H04W 36/322 |

OTHER PUBLICATIONS

International Search Report and Written Opinion (ISA/237) of the International Search Authority for International Patent Application No. PCT/JP2022/000287, mailed by the Japan Patent Office on Apr. 12, 2022.

* cited by examiner

CONTROL DEVICE, COMPUTER READABLE STORAGE MEDIUM, SYSTEM, AND CONTROL METHOD

The contents of the following patent application(s) are incorporated herein by reference:
NO. 2021-003538 filed in JP on Jan. 13, 2021
NO. PCT/JP2022/000287 filed in WO on Jan. 6, 2022

BACKGROUND

1. Technical Field

The present invention relates to a control device, a computer readable storage medium, a system, and a control method.

2. Related Art

Patent document 1 describes a flight vehicle which forms a multi-cell on a ground by emitting beam towards the ground to provide a wireless communication service to user terminals in the multi-cell.

LIST OF CITED REFERENCES

Patent Document

Patent Document 1: Japanese Patent Application Publication No. 2020-170888

DESCRIPTION OF EXEMPLARY EMBODIMENTS

A flight vehicle which forms cells on a ground while flying in a sky to provide a wireless communication service may require replacement with another flight vehicle for maintenance or the like. In a case where there are a flight vehicle A which has already configured a service area and a flight vehicle B arriving for the replacement, a method needs to be configured when the service based on the flight vehicle A is stopped, and the service is resumed by the flight vehicle B. In a system 10 according to the present embodiment, by adjusting transmission output of the flight vehicle A which has already configured the service area and the flight vehicle B arriving for the replacement, a number of handovers per unit time from cells of the flight vehicle A to cells of the flight vehicle B is controlled to aim for avoiding interference between the cells of the flight vehicle A and the cells of the flight vehicle B and for avoiding an overloaded state of the flight vehicle B.

Hereinafter, the present invention will be described through embodiments of the present invention, but the following embodiments do not limit the present invention according to claims. In addition, not all combinations of features described in the embodiment are essential to the solution of the invention.

Figure 1:
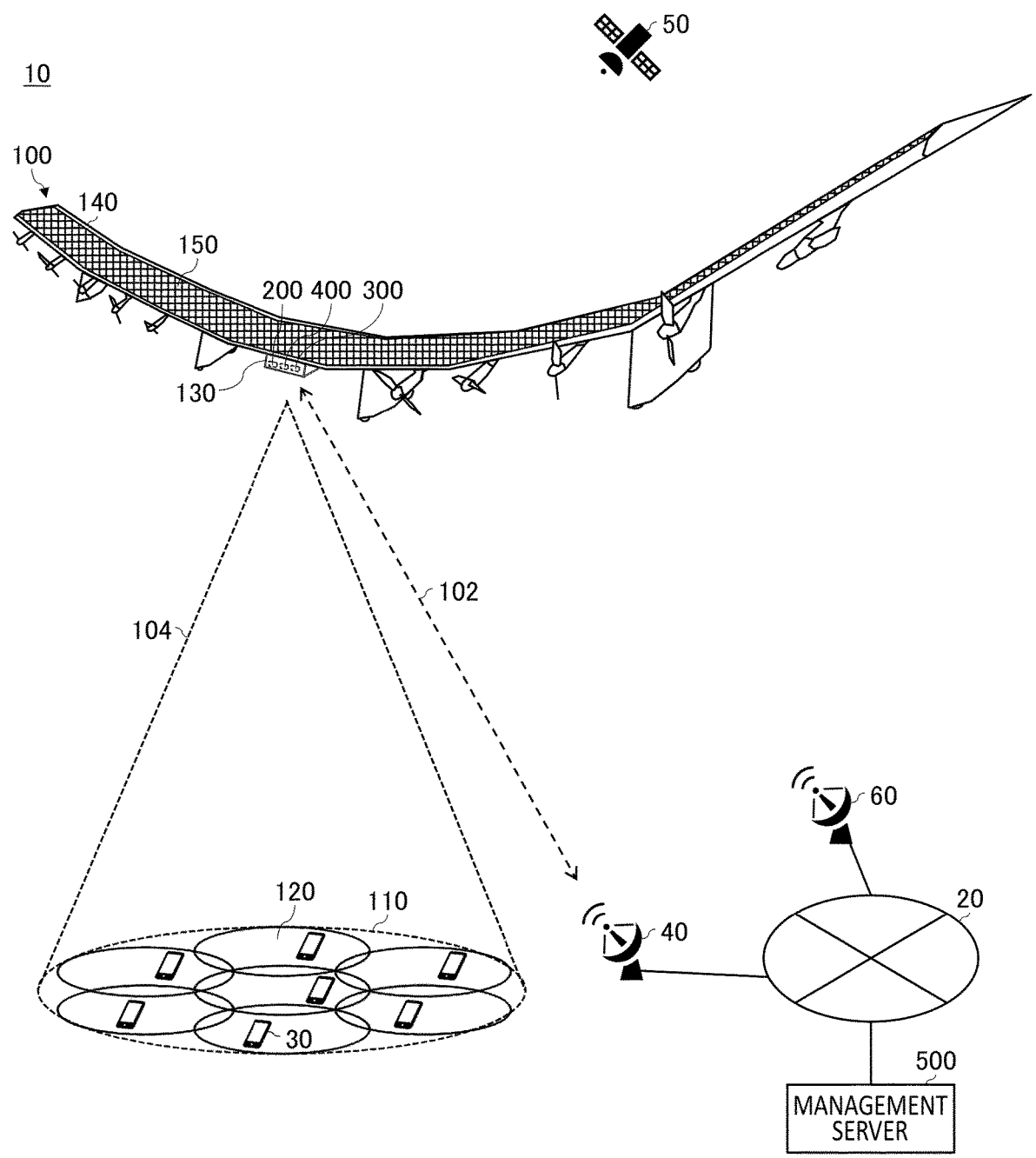
FIG. 1 schematically illustrates an example of a system 10.

FIG. 1 schematically illustrates an example of a system 10. The system 10 may include a plurality of flight vehicles 100. The system 10 may include a management server 500 which manages the plurality of flight vehicles 100.

The flight vehicle 100 forms a multi-cell 110 including a plurality of cells 120 on a ground to provide a wireless communication service to user terminals 30 in the multi-cell 110. The flight vehicle 100 may be an HAPS (high altitude platform station). The flight vehicle 100 may function as a stratospheric platform. For example, while flying in a stratosphere, the flight vehicle 100 forms a feeder link 102 with a gateway 40 on the ground, and also forms the multi-cell 110 by emitting beam 104 towards the ground.

The flight vehicle 100 may include a body section 130, the wing section 140, and a solar panel 150. Electrical power generated by the solar panel 150 is stored in one or more batteries arranged in at least any of the body section 130 or the wing section 140. The electrical power stored in the battery is used by each of the components included in the flight vehicle 100.

A flight control device 200, a communication control device 300, and a control device 400 are arranged in the body section 130. The flight control device 200 controls flight of the flight vehicle 100. The communication control device 300 controls communication of the flight vehicle 100.

The control device 400 controls the communication control device 300. The control device 400 and the communication control device 300 may be integrated to each other. That is, the control device 400 may further function as the communication control device 300. The control device 400 may control the flight control device 200. The control device 400 and the flight control device 200 may be integrated to each other. That is, the control device 400 may further function as the flight control device 200. The flight control device 200, the communication control device 300, and the control device 400 may be integrated to each other. That is, the control device 400 may further function as the flight control device 200 and the communication control device 300.

The flight control device 200 controls the flight of the flight vehicle 100 controlling, for example, a rotation of a propeller, an angle of a flap or an elevator, or the like. The flight control device 200 may manage various types of sensors included in the flight vehicle 100. Examples of the sensors include a positioning sensor such as a GPS (Global Positioning System) sensor, a gyro sensor, an acceleration sensor, a wind sensor, and the like. The flight control device 200 may manage a position, an attitude, a movement direction, a movement speed, and the like of the flight vehicle 100 by outputs of the various types of sensors.

The communication control device 300 may form the feeder link 102 with the gateway 40 by using an FL (Feeder Link) antenna. The communication control device 300 may access a network 20 via the gateway 40.

The communication control device 300 may form the multi-cell 110 by emitting the beam 104 towards the ground by using an SL (Service Link) antenna. The multi-cell 110 is configured by a plurality of cells 120. In FIG. 1, a case has been exemplified where the number of cells 120 is seven but the number of cells 120 is not limited to this. The communication control device 300 may establish a service link with the user terminal 30 in the multi-cell 110.

The communication control device 300 relays communication between the network 20 and the user terminal 30 via the feeder link 102 and the service link, for example. The communication control device 300 may provide the wireless communication service to the user terminal 30 by relaying the communication between the user terminal 30 and the network 20.

The network 20 may include a core network managed by a telecommunications carrier. The core network may be compliant to an LTE (Long Term Evolution) communication method. That is, the core network may be an EPC (Evolved Packet Core). In this case, the communication control device 300 may function as eNB (eNodeB). The core network may be compliant to a 5G (5th Generation) communication method. That is, the core network may be a 5GC (5th Generation Core network). In this case, the communication control device 300 may function as gNB (gNodeB). The core network may be compliant to a 3G (3rd Generation) communication method, or may be compliant to a 6G (6th Generation) communication method and subsequent communication methods. The network 20 may include the Internet.

The user terminal 30 may be any communication terminal as long as the user terminal 30 can communicate with the flight vehicle 100. For example, the user terminal 30 is a mobile phone such as a smartphone. The user terminal 30 may be a tablet terminal, a PC (Personal Computer), and the like. The user terminal 30 may also be a so-called IoT (Internet of Thing) device. The user terminal 30 may include anything that corresponds to a so-called IoE (Internet of Everything).

The flight vehicle 100 may circle in a sky above a target area in order to cover the target area on the ground by the multi-cell 110. For example, while carrying out patrol flight in the sky above the target area in a predetermined flight path such as a circular, D-shaped, or 8-shaped flight path, the flight vehicle 100 maintains the feeder link 102 with the gateway 40 by adjusting an orientation direction of the FL antenna, and maintains the coverage of the target area by the multi-cell 110 by adjusting an orientation direction of the SL antenna. Patrolling in a fixed flight path in the sky above the target area in this manner may be referred to as a fixed point flight.

The management server 500 manages the flight vehicle 100. The management server 500 is arranged in the core network, for example. The management server 500 communications with the flight vehicle 100 via network 20 and the gateway 40, for example. In addition, the management server 500 communications with the flight vehicle 100 via a satellite gateway 60 and a communications satellite 50, for example. The management server 500 may control the flight vehicle 100 by transmitting an instruction.

The management server 500 may cause the flight vehicle 100 to perform the fixed point flight in the sky above the target area in order to cover the target area on the ground by the multi-cell 110, for example. For each of a plurality of target areas, the management server 500 may cause the flight vehicle 100 to cover each of the plurality of target areas by performing the fixed point flight.

The flight vehicle 100 is required to land back to the ground for carrying out maintenance in a predetermined cycle such as once in every six months, for example. For example, the flight vehicle 100 is also required to land back to the ground when the battery deteriorates, an issue such as a failure occurs in various types of components such as the propeller, the flap, the elevator, and the solar panel 150.

When the flight vehicle 100 is caused to simply land back, the provision of the wireless communication service in the target area on the ground covered by the flight vehicle 100 is terminated, and therefore it is desirable that the flight vehicle 100 is to be replaced with another flight vehicle 100. When a first flight vehicle 100 which covers a certain target area is to be replaced with a second flight vehicle 100, for example, it is conceivable that the first flight vehicle 100 is caused to stop the provision of the wireless communication service, and the second flight vehicle 100 is caused to head to a flight area where the first flight vehicle 100 has been flying to start the provision of the wireless communication service by the second flight vehicle 100. However, in this case, at the time of transfer, a service interruption temporarily occurs, or a service quality temporarily deteriorates. In a case of a radio base station installed on the ground, a size of its coverage area is rather limited, and the temporary service quality deterioration may be acceptable. However, for example, in a case of the flight vehicle 100 which functions as the stratospheric platform, its coverage area becomes vast, and an impact may be extensive. The flight vehicle 100 according to the present embodiment has a function which contributes to appropriate performance of the replacement with another flight vehicle 100.

FIG. 2 to FIG. 5 are explanatory diagrams for describing processing content at the time of the replacement. Herein, a case will be used as an example for the description where a flight vehicle A 160 which forms three cells including a cell 162, a cell 164, and a cell 166 on the ground is to be replaced with a flight vehicle B 170. In the drawings, the user terminal 30 covered by the flight vehicle A 160 is represented by "A", and the user terminal 30 covered by the flight vehicle B 170 is represented by "B".

Figure 2:
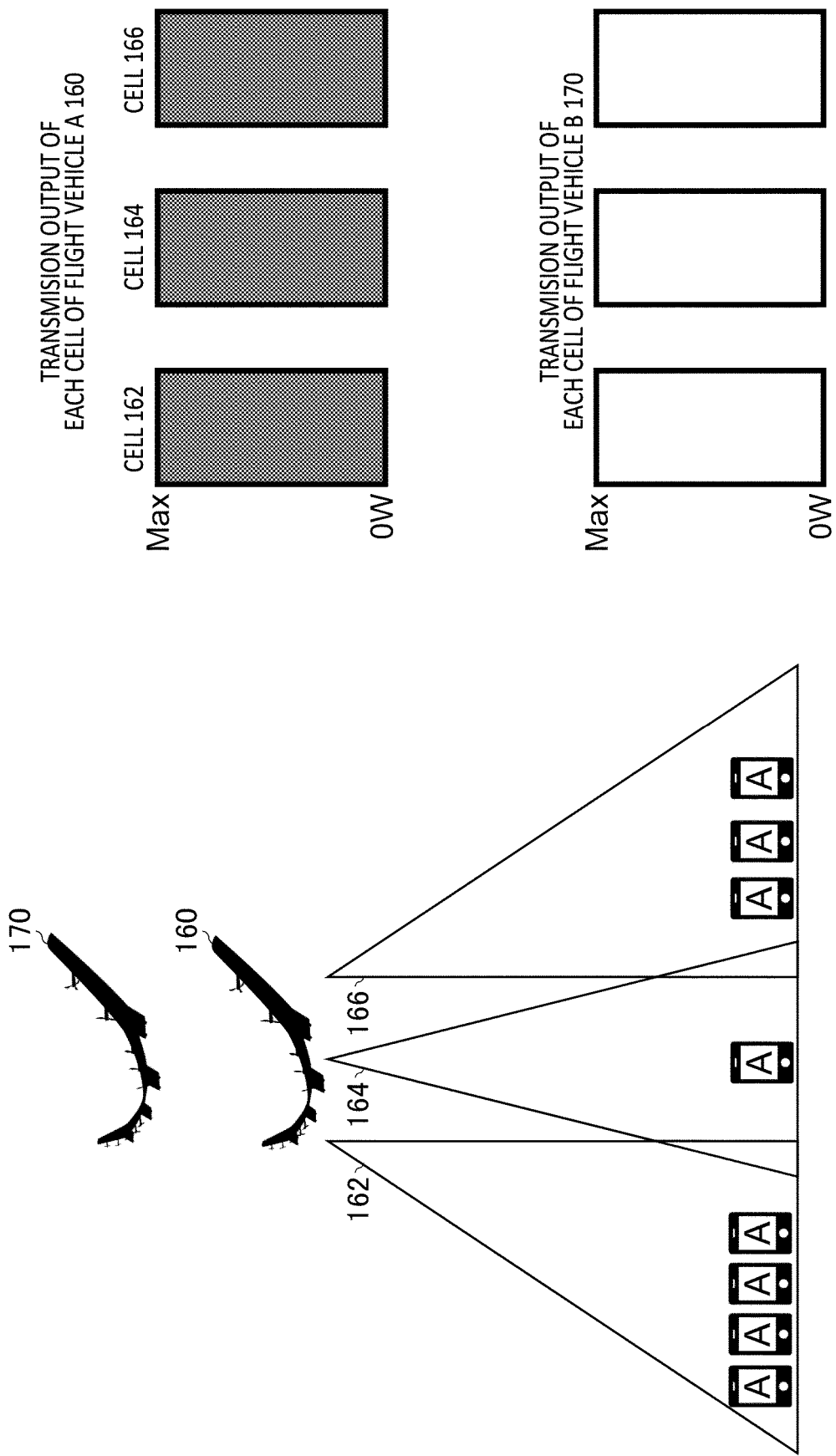
FIG. 2 is an explanatory diagram for describing processing content at the time of replacement.

FIG. 2 illustrates a state in which the flight vehicle B 170 has moved to a position corresponding to the flight vehicle A 160 to replace the flight vehicle A 160. In FIG. 2, a case is exemplified where the flight vehicle B 170 is located at a position directly above the flight vehicle A 160 as the position corresponding to the flight vehicle A 160, but is not limited to this. For example, when the flight vehicle A 160 is flying on a circular flight path, the position corresponding to the flight vehicle A 160 may be a position deviated by 180 degrees relative to the flight vehicle A 160 on the flight path. In addition to the above, the position corresponding to the flight vehicle A 160 may be any position for carrying out the replacement with the flight vehicle A 160.

At a time point at which the flight vehicle B 170 has arrived at the position corresponding to the flight vehicle A 160, the service is provided from the flight vehicle A 160. Each of the cells of the flight vehicle A 160 is operated at radio wave output required to maintain the service. In this example, a case will be used as an example for the description where the radio wave output at this time is MAX, but is not limited to this. As long as the service can be maintained, the radio wave output may be lower than MAX. At this moment, the flight vehicle B 170 has not yet performed any output.

Figure 3:
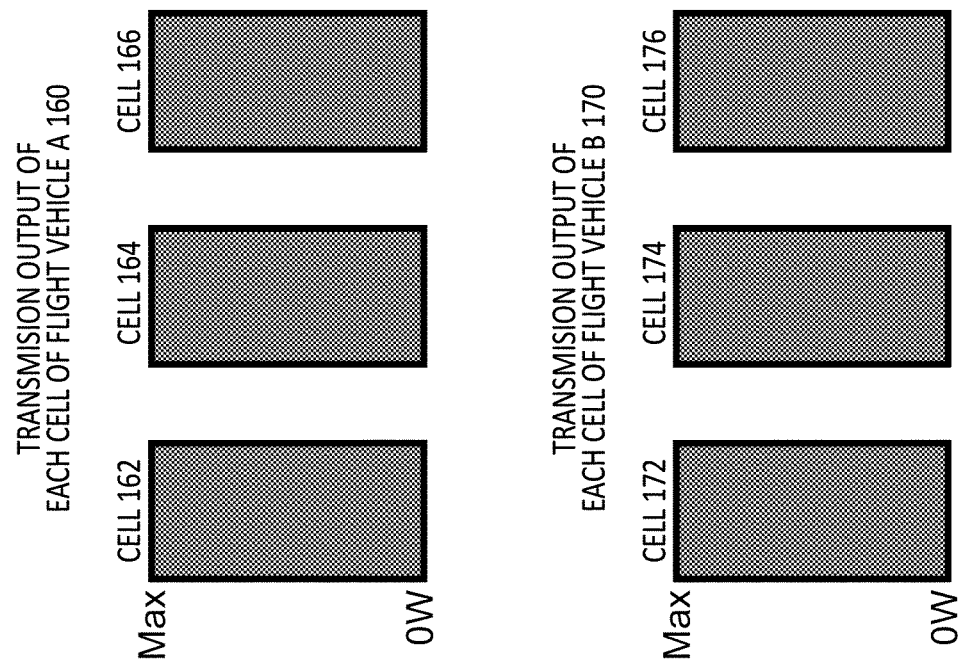
FIG. 3 is an explanatory diagram for describing the processing content at the time of the replacement.
Figure 3:
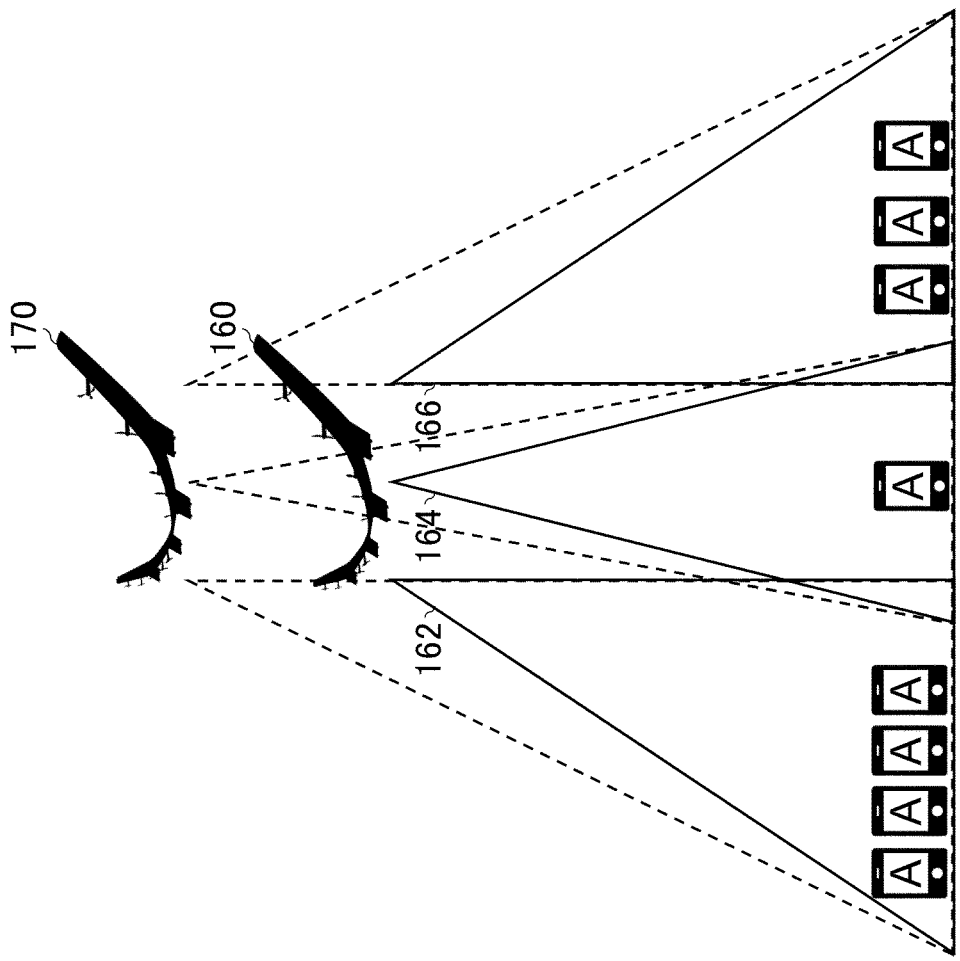

As illustrated in FIG. 3, the flight vehicle B 170 transmits radio waves to configure service for areas that are same as target areas respectively covered by the cell 162, the cell 164, and the cell 166. At this time, the flight vehicle B 170 uses a same frequency as that of the flight vehicle A 160. That is, the flight vehicle B 170 forms a cell 172 in a same frequency as that of the cell 162, forms a cell 174 in a same frequency as that of the cell 164, and forms a cell 176 in a same frequency as that of the cell 166. As a result, the cell 162 and the cell 172 cause interference to each other, the cell 164 and the cell 174 cause interference to each other, and the cell 166 and the cell 176 cause interference to each other.

Figure 4:
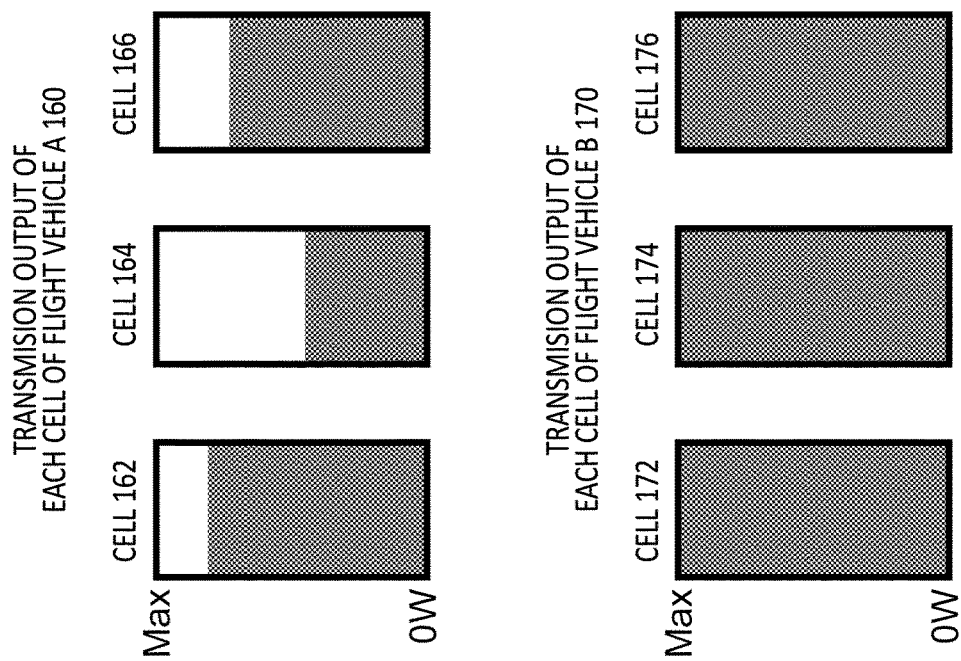
FIG. 4 is an explanatory diagram for describing the processing content at the time of the replacement.
Figure 4:
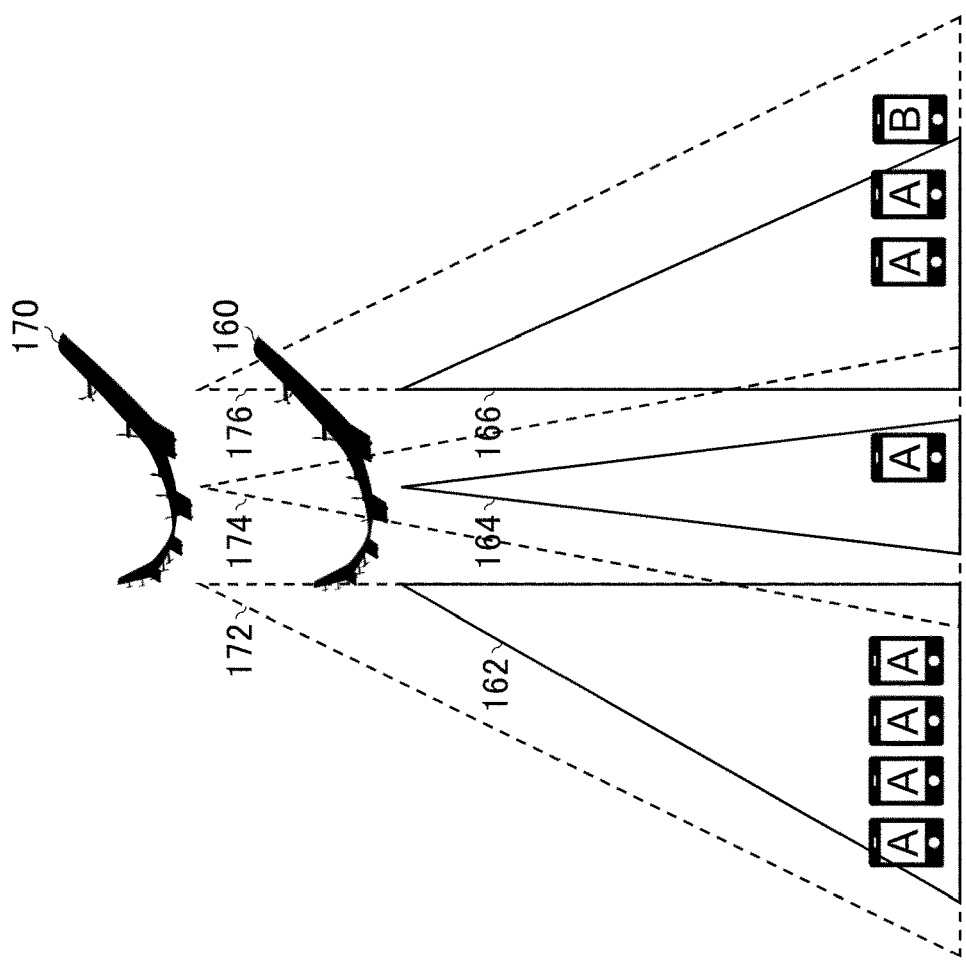
Figure 5:
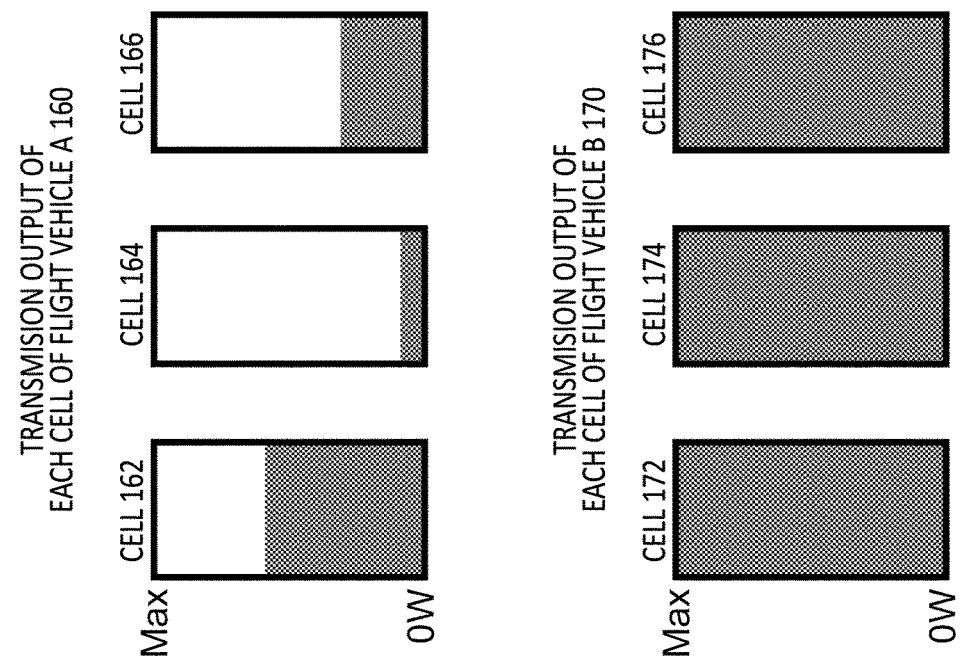
FIG. 5 is an explanatory diagram for describing the processing content at the time of the replacement.
Figure 5:
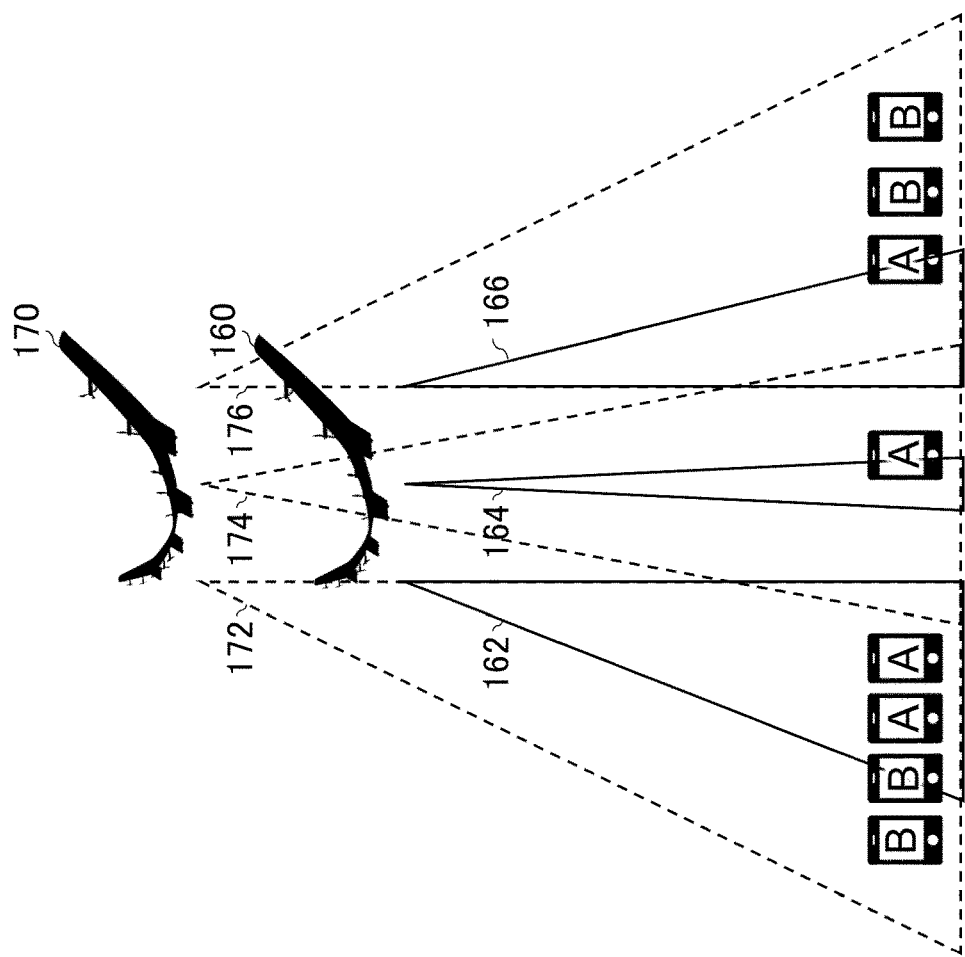

As illustrated in FIG. 4 and FIG. 5, in response to a state where the flight vehicle B 170 has started forming the cell 172, the cell 174, and the cell 176, the flight vehicle A 160 decreases radio wave output. Herein, with regard to each of the cell 162, the cell 164, and the cell 166, the flight vehicle A 160 sets a speed at which the radio wave output is decreased to be depended on a number of RRC Connected Users (which may be referred to as CU count) who have connection. As the CU count is higher, an output decreasing speed is set to be slower, and as the CU count is lower, the output decreasing speed is set to be faster.

By changing the output decreasing speed according to the CU count, the number of handovers per unit time from the cells of the flight vehicle A 160 to the cells of the flight vehicle B 170 can be controlled. Since the flight vehicle B 170 serves as an accepting side of the handover, when the number of handovers per unit time is higher, the communication control device 300 of the flight vehicle B 170 may be put into an overloaded state, and it may not be possible to perform communication. Thus, such control is carried out.

Note that as additional device for avoiding the overloaded state of the flight vehicle B 170, the following two algorithms may be further introduced. According to a first algorithm, the cell of the flight vehicle A 160 checks a number of user terminals 30 handed over to be out from the flight vehicle A 160 in unit time, and increases or decreases the output decreasing speed depending on a magnitude of the number. The number of user terminals 30 handed over to be out from the flight vehicle A 160 in unit time can be autonomously determined by the flight vehicle A 160.

According to a second algorithm, the cell of the flight vehicle B 170 checks a number of user terminals 30 handed over to be in to the flight vehicle B 170 in unit time, and determines whether a magnitude of the number may become an overload for the cell of the flight vehicle B 170. For example, when it is determined that the magnitude of the number may become the overload, the flight vehicle B 170 transmits notification information for informing that effect to the flight vehicle A 160, and in response to reception of the notification information, the flight vehicle A 160 slows down the output decreasing speed.

The flight vehicle B 170 transmits the notification information to the flight vehicle A 160 through the communications satellite 50, for example. In addition, the flight vehicle B 170 transmits the notification information to the flight vehicle A 160 through the feeder link 102, for example. As a specific example, the flight vehicle B 170 transmits the notification information to the flight vehicle A 160 via the gateway 40. In addition, as a specific example, the flight vehicle B 170 transmits the notification information to the flight vehicle A 160 via the management server 500.

When the flight vehicle B 170 can directly wirelessly communicate with the flight vehicle A 160, the flight vehicle B 170 may directly transmit to the notification information to the flight vehicle A 160. For example, the flight vehicle B 170 and the flight vehicle A 160 perform direct communication by forming a feeder link in the sky. When a network is configured by a plurality of flight vehicles 100 including the flight vehicle B 170 and the flight vehicle A 160 in the sky, the flight vehicle B 170 may transmit the notification information to the flight vehicle A 160 via the network in the sky.

Figure 6:
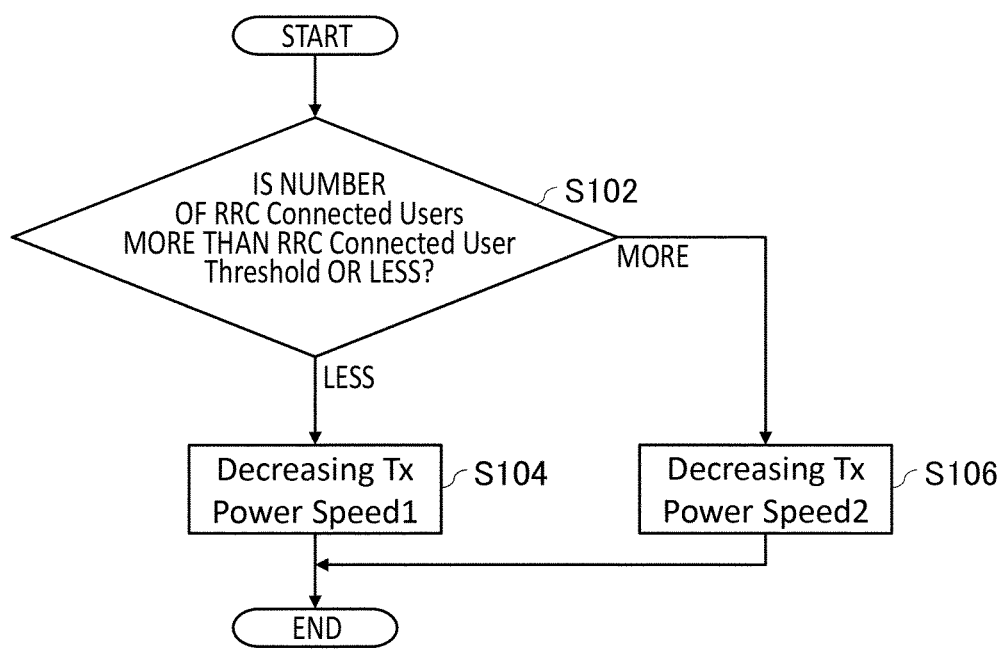
FIG. 6 schematically illustrates an example of a flow of processing by a first flight vehicle 100 which is to be replaced.

FIG. 6 schematically illustrates an example of a flow of processing by the first flight vehicle 100 to be replaced. The processing may be started in response to a state where the replacing second flight vehicle 100 has started forming a plurality of cells 120 to be aligned with a position of each of a plurality of cells 120 formed by the first flight vehicle 100, each of the plurality of cells 120 formed by the second flight vehicle 100 being in a same frequency band as that of each of the plurality of cells formed by the first flight vehicle 100. The first flight vehicle 100 may perform processing illustrated in FIG. 6 with regard to each of the plurality of formed cells 120.

In step (which may be abbreviated and referred to as S) 102, the first flight vehicle 100 determines whether a number of RRC Connected Users is more than RRC Connected User Threshold or less. The number of RRC Connected Users may be a number of user terminals 30 put into RRC Connected state in the cell 120 that is set as a target. The RRC Connected User Threshold may be a number of RRC Connected Users which is set as a threshold at which the radio wave output of each of the cells 120 is significantly decreased or slightly decreased, and may be preset.

When it is determined that the number of RRC Connected Users is less than the RRC Connected User Threshold, the flow proceeds to S104, and when it is determined that the number of RRC Connected Users is more than the RRC Connected User Threshold, the flow proceeds to S106. In S104, the first flight vehicle 100 sets the output decreasing speed at Decreasing Tx Power Speed 1. In S106, the first flight vehicle 100 sets the output decreasing speed at Decreasing Tx Power Speed 2.

Tx Power may be output of a radio wave of a transmitting cell. Decreasing Tx Power Speed may be an amount of Tx Power to be decreased in unit time. The Decreasing Tx Power Speed 1 is faster than the Decreasing Tx Power Speed 2. Thus, when a number of user terminals 30 present in the cell of the first flight vehicle 100 is high, by slowing down the output decreasing speed, generation of a situation where handovers of the user terminals 30 from the first flight vehicle 100 to the second flight vehicle 100 occur at once can be suppressed. On the other hand, thus, when the number of user terminals 30 present in the cell of the first flight vehicle 100 is low, by speeding up the output decreasing speed, a period of time during which the interference between the cell of the first flight vehicle 100 and the cell of the second flight vehicle 100 occurs can be shortened.

Figure 7:
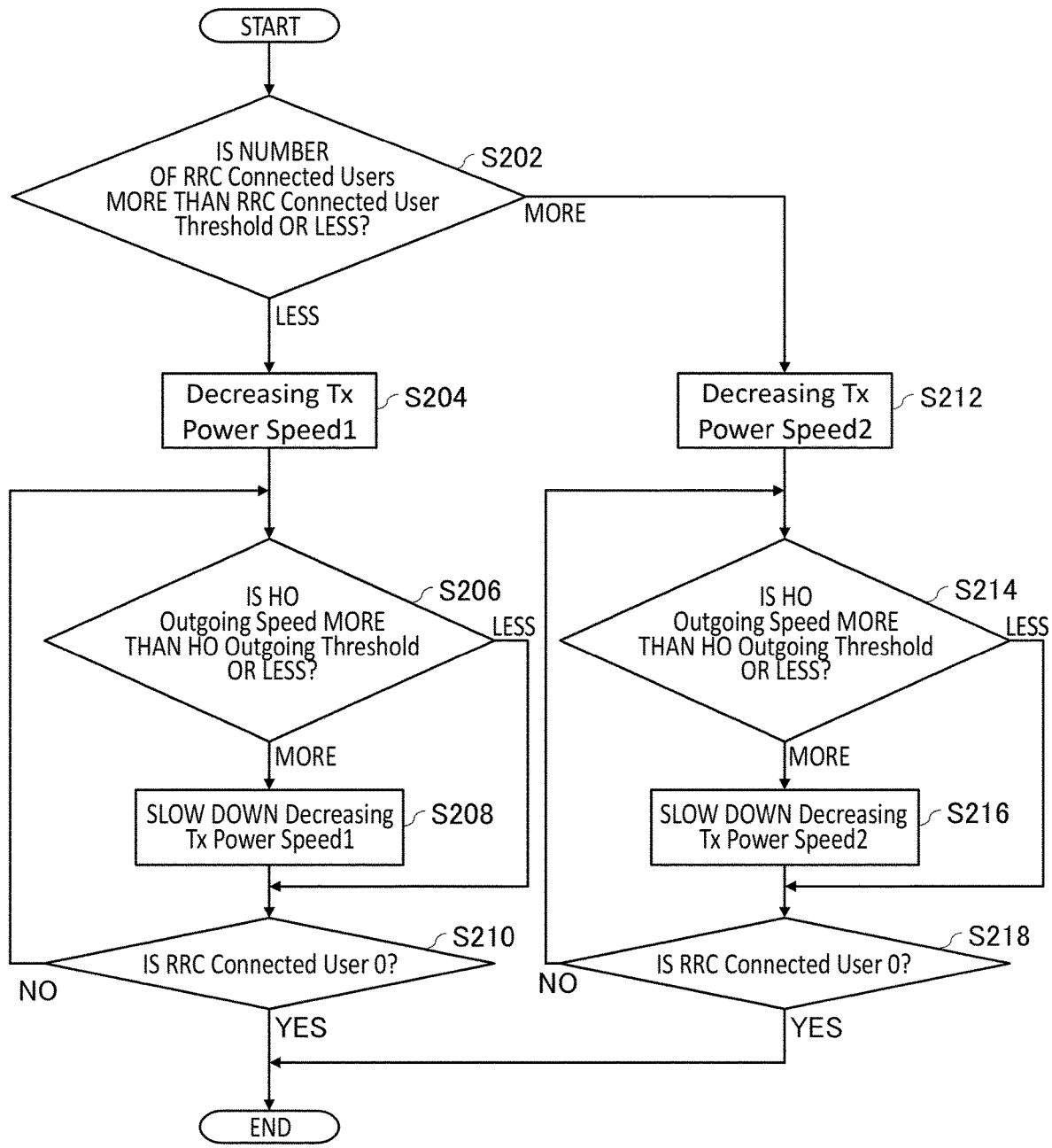
FIG. 7 schematically illustrates a flow of the processing by the first flight vehicle 100 when a first algorithm is implemented.

FIG. 7 schematically illustrates a flow of the processing by the first flight vehicle 100 when the first algorithm is implemented. Here, differences from FIG. 6 will be mainly described.

In S202, the first flight vehicle 100 determines whether the number of RRC Connected Users is more than the RRC Connected User Threshold or less. When it is determined that the number of RRC Connected Users is less than the RRC Connected User Threshold, the flow proceeds to S204, and when it is determined that the number of RRC Connected Users is more than the RRC Connected User Threshold, the flow proceeds to S212. In S204, the first flight vehicle 100 sets the output decreasing speed at the Decreasing Tx Power Speed 1.

In S206, the first flight vehicle 100 determines whether HO Outgoing Speed is more than HO Outgoing Threshold or less. The HO Outgoing Speed may be a number of user terminals 30 handed over to be out from the cell in unit time. The HO Outgoing Threshold may be HO Outgoing Speed that is set as a threshold at which it is determined whether the Decreasing Tx Power Speed is to be increased or decreased, and may be preset.

When it is determined that the HO Outgoing Speed is more than the HO Outgoing Threshold, the flow proceeds to S208, and when it is determined that the HO Outgoing Speed is less than the HO Outgoing Threshold, the flow proceeds to S210. In S208, the first flight vehicle 100 slows down the Decreasing Tx Power Speed 1. In S210, the first flight vehicle 100 determines whether the RRC Connected User is 0. When it is determined that the RRC Connected User is not 0, the flow returns to S206, and when it is determined that the RRC Connected User is 0, the processing is ended.

In S212, the first flight vehicle 100 sets the output decreasing speed at the Decreasing Tx Power Speed 2. In S214, the first flight vehicle 100 determines whether the HO Outgoing Speed is more than the HO Outgoing Threshold or less.

When it is determined that the HO Outgoing Speed is more than the HO Outgoing Threshold, the flow proceeds to S216, and when it is determined that the HO Outgoing Speed is less than the HO Outgoing Threshold, the flow proceeds to S218. In S216, the first flight vehicle 100 slows down the Decreasing Tx Power Speed 2. In S218, the first flight vehicle 100 determines whether the RRC Connected User is 0. When it is determined that RRC Connected User is not 0, the processing is returned to S214, and when it is determined that the RRC Connected User is 0, the processing is ended.

Thus, when the number of user terminals 30 handed over to be out from the cell 120 of the first flight vehicle 100 is high, that is, when the number of user terminals 30 handed over to be out from the cell 120 of the first flight vehicle 100 to the cell 120 of the second flight vehicle 100 is high, the output decreasing speed can be slowed down, and it is possible to suppress an increase in the load on the communication control device 300 of the second flight vehicle 100.

Figure 8:
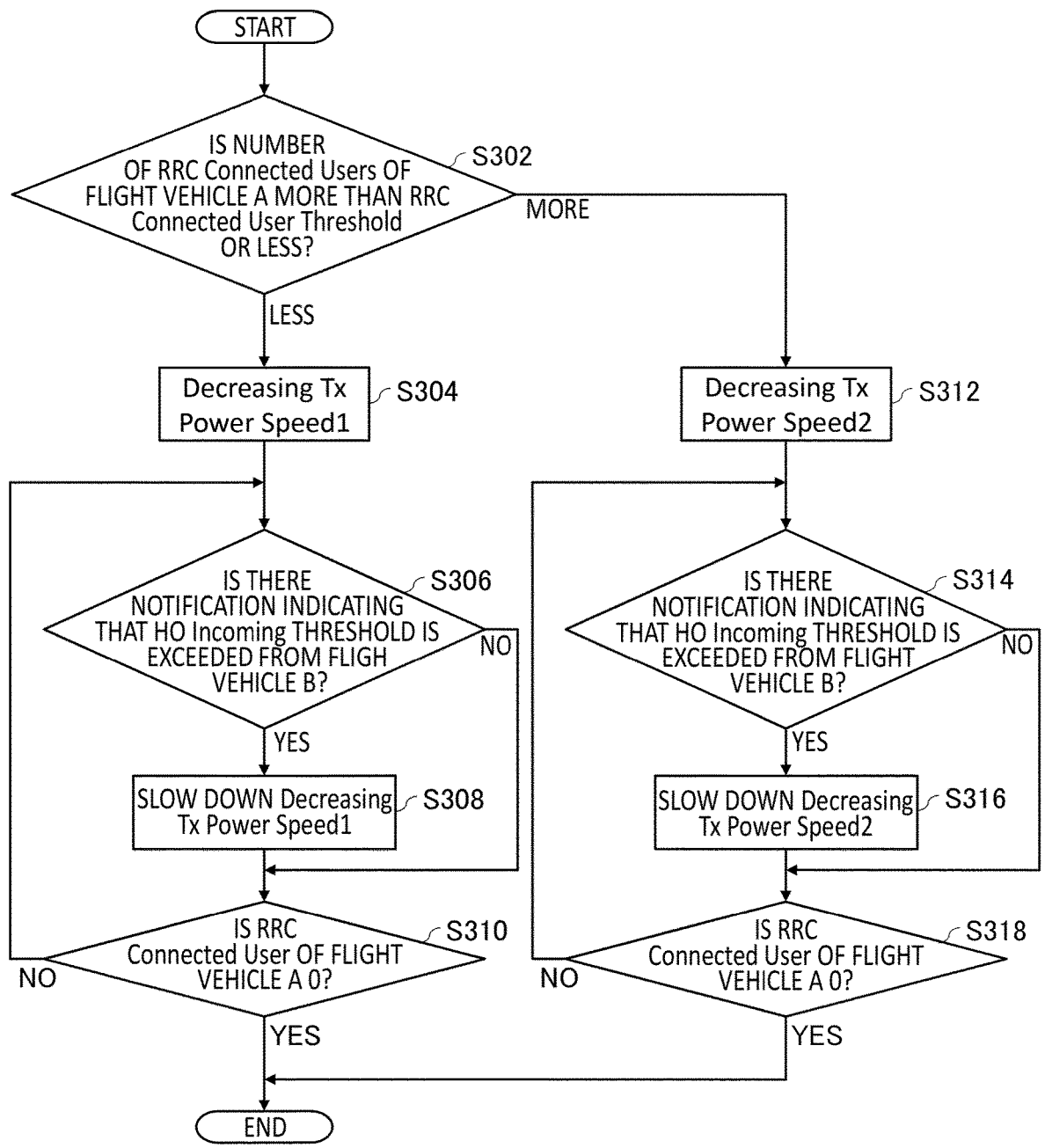
FIG. 8 schematically illustrates a flow of the processing by the first flight vehicle 100 when a second algorithm is implemented.

FIG. 8 schematically illustrates a flow of the processing by the first flight vehicle 100 (referred to as the flight vehicle A) when the second algorithm is implemented. Here, differences from FIG. 6 will be mainly described.

In S302, the first flight vehicle 100 determines whether the number of RRC Connected Users is more than the RRC Connected User Threshold or less. When it is determined that the number of RRC Connected Users is less than the RRC Connected User Threshold, the flow proceeds to S304, and when it is determined that the number of RRC Connected Users is more than the RRC Connected User Threshold, the flow proceeds to S312. In S304, the first flight vehicle 100 sets the output decreasing speed at the Decreasing Tx Power Speed 1.

In S306, the first flight vehicle 100 determines whether there is a notification indicating that HO Incoming Threshold is exceeded from the second flight vehicle 100 (referred to as the flight vehicle B). The second flight vehicle 100 regularly determines whether the HO Incoming Speed of the second flight vehicle 100 is more than the HO Incoming Threshold or less, and when it is determined that the HO Incoming Speed of the second flight vehicle 100 is more than the HO Incoming Threshold, the second flight vehicle 100 notifies the first flight vehicle 100 of that effect.

The HO Incoming Speed may be a number of user terminals 30 handed over to be in to the cell in unit time. The HO Incoming Threshold may be HO Incoming Speed that is set as a threshold at which it is determined whether the Decreasing Tx Power Speed is to be increased or decreased, and may be preset.

When it is determined that there is a notification, the flow proceeds to S308, and when it is determined that there is no notification, the flow proceeds to S310. In S318, the first flight vehicle 100 determines whether the RRC Connected User of the first flight vehicle 100 is 0. When it is determined that the RRC Connected User is not 0, the processing is returned to S306, and when it is determined that the RRC Connected User is 0, the processing is ended.

In S312, the first flight vehicle 100 sets the output decreasing speed at the Decreasing Tx Power Speed 2. In S314, the first flight vehicle 100 determines whether there is a notification indicating that the HO Incoming Threshold is exceeded from the second flight vehicle 100.

When it is determined that there is a notification, the flow proceeds to S316, and when it is determined that there is no notification, the flow proceeds to S318. In S316, the first flight vehicle 100 determines whether the RRC Connected User of the first flight vehicle 100 is 0. When it is determined that the RRC Connected User is not 0, the flow returns to S314, and when it is determined that the RRC Connected User is 0, the processing is ended.

Thus, when the number of user terminals 30 handed over to be out from the cell 120 of the first flight vehicle 100 to the cell 120 of the second flight vehicle 100 is high, the output decreasing speed can be slowed down, and it is possible to suppress an increase in the load on the communication control device 300 of the second flight vehicle 100.

Figure 9:
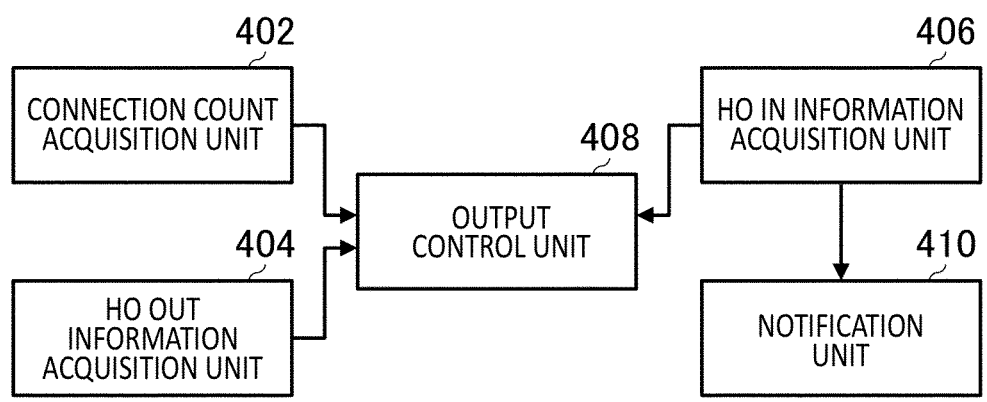
FIG. 9 schematically illustrates an example of a functional configuration of a control device 400.

FIG. 9 schematically illustrates an example of a functional configuration of the control device 400. The control device 400 includes a connection count acquisition unit 402, an HO Out information acquisition unit 404, an HO In information acquisition unit 406, an output control unit 408, and a notification unit 410.

The connection count acquisition unit 402 acquires a number of connections of the user terminals 30 with regard to each of the plurality of cells 120 formed by the communication control device 300. The connection count acquisition unit 402 may acquire the number of connections of the user terminals 30 for each of the plurality of cells 120 from the communication control device 300.

The HO Out information acquisition unit 404 acquires HO Out information indicating a status of the user terminals 30 handed over to be out with regard to each of the plurality of cells 120 formed by the communication control device 300. The HO Out information acquisition unit 404 may acquire the HO Out information of each of the plurality of cells 120 from the communication control device 300. The HO Out information acquisition unit 404 may acquire the HO Out information indicating a number of user terminals 30 handed over to be out per unit time with regard to each of the plurality of cells 120 formed by the communication control device 300.

The HO In information acquisition unit 406 acquires HO In information indicating a status of the user terminals 30 handed over to be in with regard to each of the plurality of cells 120 of another flight vehicle 100 (which may be referred to as a replacement flight vehicle) which replaces the flight vehicle 100 (which may be referred to as its own flight vehicle) to which the control device 400 is mounted. The HO In information acquisition unit 406 may acquire the HO In information indicating a number of user terminals 30 handed over to be in per unit time with regard to each of the plurality of cells 120 of the replacement flight vehicle.

The HO In information acquisition unit 406 may receive the HO In information from the replacement flight vehicle. The HO In information acquisition unit 406 receives the HO In information, for example, from the replacement flight vehicle through the communications satellite 50. In addition, the HO In information acquisition unit 406 receives the HO In information, for example, from the replacement flight vehicle through the gateway 40. In addition, the HO In information acquisition unit 406 receives the HO In information, for example, from the replacement flight vehicle via direct communication between the flight vehicle 100 and another flight vehicle 100. In addition, the HO In information acquisition unit 406 receives the HO In information from the replacement flight vehicle, for example, via a network configured in the sky by the plurality of flight vehicles 100 including its own flight vehicle and the replacement flight vehicle.

The output control unit 408 controls radio wave output by the communication control device 300. The output control unit 408 performs control such that in response to a state where the replacement flight vehicle has started forming a plurality of cells 120 to be aligned with a position of each of a plurality of cells 120 formed by the communication control device 300 of its own flight vehicle, each of the plurality of cells formed by the replacement flight vehicle being in a same frequency band as that of each of the plurality of cells 120 formed by the communication control device, the radio wave output of the plurality of cells 120 of its own flight vehicle continuously falls. The output control unit 408 may individually control the decreasing speed of the radio wave output with regard to each of the plurality of cells 120.

For example, the output control unit 408 controls the decreasing speed of the radio wave output based on the number of connections acquired by the connection count acquisition unit 402 with regard to each of the plurality of cells 120 of its own flight vehicle. For example, the output control unit 408 slows down the decreasing speed of the radio wave output as the number of connections of the user terminals 30 is higher with regard to each of the plurality of cells 120 of its own flight vehicle. The output control unit 408 may set the decreasing speed of the radio wave output to be slower as the number of connections of the user terminals 30 is higher with regard to each of the plurality of cells 120 of its own flight vehicle.

In addition, for example, the output control unit 408 speeds up the decreasing speed of the radio wave output as the number of connections of the user terminals 30 is lower with regard to each of the plurality of cells 120 of its own flight vehicle. The output control unit 408 may set the decreasing speed of the radio wave output to be faster as the number of connections of the user terminals 30 is lower with regard to each of the plurality of cells 120 of its own flight vehicle.

The output control unit 408 may control the decreasing speed of the radio wave output based on the HO Out information acquired by the HO Out information acquisition unit 404 with regard to each of the plurality of cells 120 of its own flight vehicle. For example, the output control unit 408 slows down the decreasing speed of the radio wave output as the number of user terminals 30 handed over to be out per unit time is higher with regard to each of the plurality of cells 120 of its own flight vehicle.

The output control unit 408 may control the decreasing speed of the radio wave output based on the number of connections acquired by the connection count acquisition unit 402 and the HO Out information acquired by the HO Out information acquisition unit 404 with regard to each of the plurality of cells 120 of its own flight vehicle. For example, when the number of connections of the user terminals 30 is less than a predetermined threshold, the output control unit 408 sets the decreasing speed of the radio wave output at a first decreasing speed, and when the number of connections of the user terminals 30 is more than the predetermined threshold, the output control unit 408 sets the decreasing speed of the radio wave output at a second decreasing speed that is slower than the first decreasing speed with regard to each of the plurality of cells 120 of its own flight vehicle.

After the first decreasing speed has been set, the output control unit 408 then continues the comparison between the number of user terminals 30 handed over to be out per unit time and the predetermined threshold, and when the number of user terminals 30 handed over to be out per unit time is more than the threshold, the output control unit 408 further slows down the decreasing speed of the radio wave output. After the second decreasing speed has been set too, the output control unit 408 continues the comparison between the number of user terminals 30 handed over to be out per unit time and the predetermined threshold, and when the number of user terminals 30 handed over to be out per unit time is more than the threshold, the output control unit 408 further slows down the decreasing speed of the radio wave output.

The output control unit 408 may control the decreasing speed of the radio wave output based on the HO In information acquired by the HO In information acquisition unit 406 with regard to each of the plurality of cells 120 of its own flight vehicle. The output control unit 408 slows down the decreasing speed of the radio wave output as the number of user terminals 30 handed over to be in per unit time to a cell 120 in a corresponding position among the plurality of cells 120 of the replacement flight vehicle is higher, for example, with regard to each of the plurality of cells 120 of its own flight vehicle.

The output control unit 408 may control the decreasing speed of the radio wave output based on the number of connections acquired by the connection count acquisition unit 402 and the HO In information acquired by the HO In information acquisition unit 406 with regard to each of the plurality of cells 120 of its own flight vehicle. For example, when the number of connections of the user terminals 30 is less than the predetermined threshold, the output control unit 408 sets the decreasing speed of the radio wave output at the first decreasing speed, and when the number of connections of the user terminals 30 is more than the predetermined threshold, the output control unit 408 sets the decreasing speed of the radio wave output at the second decreasing speed that is slower than the first decreasing speed with regard to each of the plurality of cells 120 of its own flight vehicle.

After the first decreasing speed has been set, the output control unit 408 then continues the comparison between the number of user terminals 30 handed over to be in per unit time to the cell 120 in the corresponding position among the plurality of cells 120 of the replacement flight vehicle and the predetermined threshold, and when the number of user terminals 30 handed over to be in per unit time is more than the threshold, the output control unit 408 further slows down the decreasing speed of the radio wave output with regard to each of the plurality of cells 120 of its own flight vehicle. After the second decreasing speed has been set too, the output control unit 408 continues the comparison between the number of user terminals 30 handed over to be in per unit time to the cell 120 in the corresponding position among the plurality of cells 120 of the replacement flight vehicle and the predetermined threshold, and when the number of user terminals 30 handed over to be in per unit time is more than the threshold, the output control unit 408 further slows down the decreasing speed of the radio wave output with regard to each of the plurality of cells 120 of its own flight vehicle.

When its own flight vehicle functions as the replacement flight vehicle, the notification unit 410 transmits notification information to the flight vehicle 100 to be replaced (which may be referred to as an active flight vehicle). For example, the HO In information acquisition unit 406 acquires the HO In information indicating the number of the user terminals 30 handed over to be in with regard to each of the plurality of cells 120 of its own flight vehicle. The notification unit 410 then transmits notification information including the HO In information to the active flight vehicle. The notification unit 410 may transmit the notification information to the active flight vehicle via the communications satellite 50 or the gateway 40. The notification unit 410 may also transmit the notification information to the active flight vehicle by way of direct communication between its own flight vehicle and the active flight vehicle or via a network in the sky.

According to the embodiment described with reference to FIG. 1 to FIG. 9, a case has been described where the control device 400 mounted to the flight vehicle 100 serves as an entity to control the decreasing speed of the radio wave output with regard to each of the plurality of cells 120 formed by the communication control device 300, but is not limited to this. The management server 500 may serve as an entity to perform the processing. The management server 500 may be an example of the control device.

Figure 10:
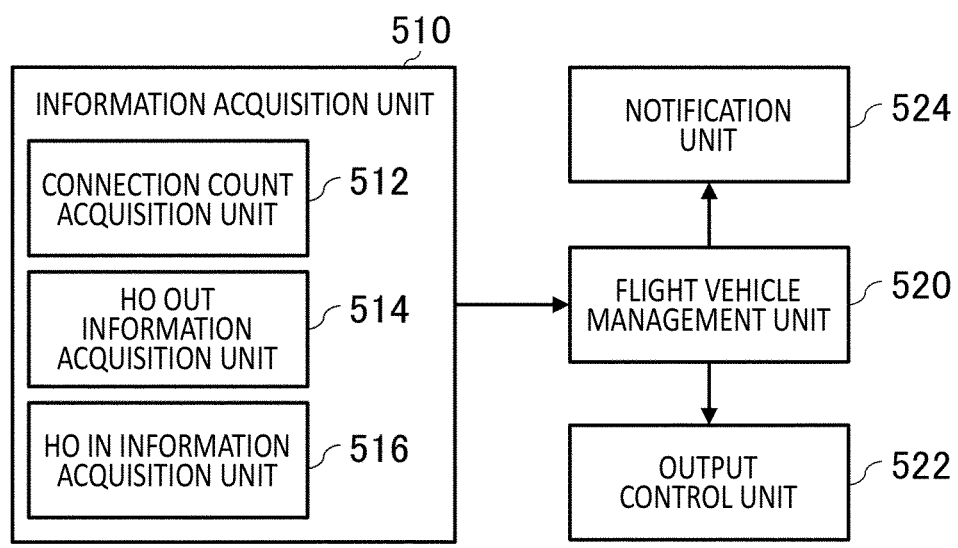
FIG. 10 schematically illustrates an example of a functional configuration of a management server 500.

FIG. 10 schematically illustrates an example of a functional configuration of the management server 500. The management server 500 includes an information acquisition unit 510, a flight vehicle management unit 520, an output control unit 522, and a notification unit 524. Note that it is not necessarily imperative that the management server 500 includes all of these.

The information acquisition unit 510 includes a connection count acquisition unit 512, an HO Out information acquisition unit 514, and an HO In information acquisition unit 516. The connection count acquisition unit 512 acquires the number of connections of the user terminals 30 with regard to each of the plurality of cells 120 formed by the active flight vehicle. The connection count acquisition unit 512 may receive the number of connections of the user terminals 30 in each of the plurality of cells 120 from the active flight vehicle.

The HO Out information acquisition unit 514 acquires the HO Out information indicating a status of the user terminals 30 handed over to be out with regard to each of the plurality of cells 120 formed by the active flight vehicle. The HO Out information acquisition unit 514 may acquire the HO Out information indicating the number of user terminals 30 handed over to be out per unit time with regard to each of the plurality of cells 120 formed by the active flight vehicle. The HO Out information acquisition unit 514 may receive the HO Out information of each of the plurality of cells 120 from the active flight vehicle. The management server 500 and the active flight vehicle may communicate via the feeder link 102, or may communicate via the communications satellite 50.

The HO In information acquisition unit 516 acquire the HO In information indicating a status of the user terminal 30 handed over to be in with regard to each of the plurality of cells 120 of the replacement flight vehicle. The HO In information acquisition unit 516 may acquire the HO In information indicating the number of user terminals 30 handed over to be in per unit time with regard to each of the plurality of cells 120 of the replacement flight vehicle. The HO In information acquisition unit 406 may receive the HO In information from the replacement flight vehicle. The management server 500 and the replacement flight vehicle may communicate via the feeder link 102, or may communicate via the communications satellite 50.

The flight vehicle management unit 520 manages a plurality of flight vehicles 100. In order to form the multi-cell 110 in a target area on the ground, the flight vehicle management unit 520 may transmit, to each of the plurality of flight vehicles 100, flight associated information such as a flight path to a fixed point flight area and a flight path in the fixed point flight area, and communication associated information such as a position and a range of the target area and configuration information related to wireless communication.

The flight vehicle management unit 520 instructs the active flight vehicle and the replacement flight vehicle to carry out replacement. The flight vehicle management unit 520 transmits, for example, to the replacement flight vehicle, a replacement instruction including information related to the active flight vehicle that is a replacement target, position information indicating a position corresponding to the active flight vehicle, and the like. The information related to the active flight vehicle may include a position and a range of each of the plurality of cells 120 formed by the active flight vehicle, and a frequency band in use. In response to reception of the replacement instruction, the replacement flight vehicle moves to the position corresponding to the active flight vehicle and starts to form the plurality of cells 120 to be aligned with a position of each of the plurality of cells 120 formed by the active flight vehicle, each of the plurality of cells formed by replacement flight vehicle being in a same frequency band as that of each of the plurality of cells 120 formed by the active flight vehicle.

The output control unit 522 controls radio wave output by the active flight vehicle. The output control unit 522 performs control such that in response to a state where the replacement flight vehicle has started forming the plurality of cells 120 to be aligned with the position of each of the plurality of cells 120 formed by the active flight vehicle, each of the plurality of cells formed by the replacement flight vehicle being in a same frequency band as that of each of the plurality of cells 120 formed by the active flight vehicle, the radio wave output of the plurality of cells 120 of the active flight vehicle continuously falls. The output control unit 522 may control the active flight vehicle by transmitting an instruction to the active flight vehicle. The output control unit 522 may individually control the decreasing speed of the radio wave output with regard to each of the plurality of cells 120.

For example, the output control unit 522 controls the decreasing speed of the radio wave output based on the number of connections acquired by the connection count acquisition unit 512 with regard to each of the plurality of cells 120 of the active flight vehicle. For example, the output control unit 522 slows down the decreasing speed of the radio wave output as the number of connections of the user terminals 30 is higher with regard to each of the plurality of cells 120 of the active flight vehicle. The output control unit 522 may set the decreasing speed of the radio wave output to be slower as the number of connections of the user terminals 30 is higher with regard to each of the plurality of cells 120 of the active flight vehicle.

In addition, for example, the output control unit 522 speeds up the decreasing speed of the radio wave output as the number of connections of the user terminals 30 is lower with regard to each of the plurality of cells 120 of the active flight vehicle. The output control unit 522 may set the decreasing speed of the radio wave output to be faster as the number of connections of the user terminals 30 is lower with regard to each of the plurality of cells 120 of the active flight vehicle.

The output control unit 522 may control the decreasing speed of the radio wave output based on the HO Out information acquired by the HO Out information acquisition unit 514 with regard to each of the plurality of cells 120 of the active flight vehicle. For example, the output control unit 522 slows down the decreasing speed of the radio wave output as the number of user terminals 30 handed over to be out per unit time is higher with regard to each of the plurality of cells 120 of the active flight vehicle.

The output control unit 522 may control the decreasing speed of the radio wave output based on the number of connections acquired by the connection count acquisition unit 512 and the HO Out information acquired by the HO Out information acquisition unit 514 with regard to each of the plurality of cells 120 of the active flight vehicle. For example, when the number of connections of the user terminals 30 is less than the predetermined threshold, the output control unit 522 sets the decreasing speed of the radio wave output at a first decreasing speed, and when the number of connections of the user terminals 30 is more than the predetermined threshold, the output control unit 522 sets the decreasing speed of the radio wave output at a second decreasing speed that is slower than the first decreasing speed with regard to each of the plurality of cells 120 of the active flight vehicle.

After the first decreasing speed has been set, the output control unit 522 then continues the comparison between the number of user terminals 30 handed over to be out per unit time and the predetermined threshold, and when the number of user terminals 30 handed over to be out per unit time is more than the threshold, the output control unit 522 further slows down the decreasing speed of the radio wave output. After the second decreasing speed has been set too, the output control unit 522 continues the comparison between the number of user terminals 30 handed over to be out per unit time and the predetermined threshold, and when the number of user terminals 30 handed over to be out per unit time is more than the threshold, the output control unit 522 further slows down the decreasing speed of the radio wave output.

The output control unit 522 may control the decreasing speed of the radio wave output based on the HO In information acquired by the HO In information acquisition unit 516 with regard to each of the plurality of cells 120 of the active flight vehicle. The output control unit 522 slows down the decreasing speed of the radio wave output as the number of user terminals 30 handed over to be in per unit time to the cell 120 in the corresponding position among the plurality of cells 120 of the replacement flight vehicle is higher, for example, with regard to each of the plurality of cells 120 of the active flight vehicle.

The output control unit 522 may control the decreasing speed of the radio wave output based on the number of connections acquired by the connection count acquisition unit 512 and the HO In information acquired by the HO In information acquisition unit 516 with regard to each of the plurality of cells 120 of the active flight vehicle. For example, when the number of connections of the user terminals 30 is less than the predetermined threshold, the output control unit 522 sets the decreasing speed of the radio wave output at the first decreasing speed, and when the number of connections of the user terminals 30 is more than the predetermined threshold, the output control unit 522 sets the decreasing speed of the radio wave output at the second decreasing speed that is slower than the first decreasing speed with regard to each of the plurality of cells 120 of the active flight vehicle.

After the first decreasing speed has been set, the output control unit 522 then continues the comparison between the number of user terminals 30 handed over to be in per unit time to the cell 120 in the corresponding position among the plurality of cells 120 of the replacement flight vehicle and the predetermined threshold, and when the number of user terminals 30 handed over to be in per unit time is more than the threshold, the output control unit 522 further slows down the decreasing speed of the radio wave output with regard to each of the plurality of cells 120 of the active flight vehicle. After the second decreasing speed has been set too, the output control unit 522 continues the comparison between the number of user terminals 30 handed over to be in per unit time to the cell 120 in the corresponding position among the plurality of cells 120 of the replacement flight vehicle and the predetermined threshold, and when the number of user terminals 30 handed over to be in per unit time is more than the threshold, the output control unit 522 further slows down the decreasing speed of the radio wave output with regard to each of the plurality of cells 120 of the active flight vehicle.

When notification information including the HO In information is received from the replacement flight vehicle, the notification unit 524 transmits the notification information to the active flight vehicle.

Figure 11:
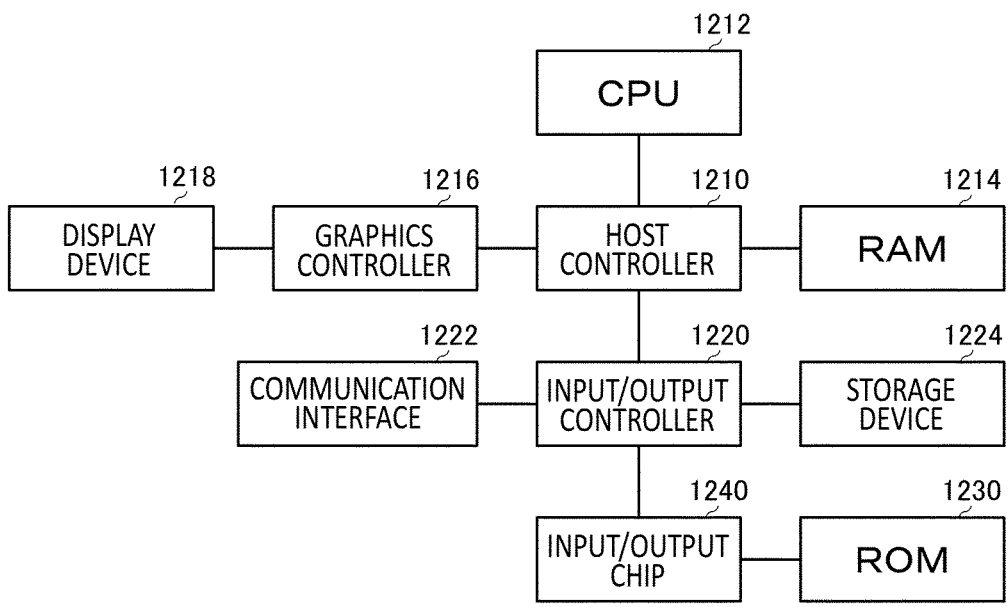
FIG. 11 schematically illustrates an example of a hardware configuration of a computer 1200 functioning as a communication control device 300.

FIG. 11 schematically illustrates an example of hardware configuration of a computer 1200 that functions as the control device 400 or the management server 500. Programs installed in the computer 1200 can cause the computer 1200 to function as one or more "units" of the device according to the present embodiment or can cause the computer 1200 to execute operations associated with the devices according to the present embodiment or the one or more "units", and/or can cause the computer 1200 to execute a process according to the present embodiment or steps of the process. Such a program may be executed by a CPU 1212 to cause the computer 1200 to perform particular operations associated with some or all of the blocks in the flowcharts and block diagrams described in the specification.

The computer 1200 according to the present embodiment includes the CPU 1212, a RAM 1214, and a graphics controller 1216, which are connected to each other via a host controller 1210. Also, the computer 1200 includes input/output units such as a communication interface 1222, a storage device 1224, a DVD drive and an IC card drive, which are connected to the host controller 1210 via an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads programs and data from an IC card and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer readable storage medium such as the DVD-ROM or the IC card. The program is read from the computer readable storage medium, installed into the storage device 1224, RAM 1214, or ROM 1230, which are also examples of a computer readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of information such as various types of programs, data, tables, and databases may be stored in a recording medium and subjected to information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The program or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of devices responsible for performing operations. A particular step and "unit" may be implemented by dedicated circuitry, programmable circuitry supplied along with a computer readable instruction stored on a computer readable storage medium, and/or a processor supplied along with the computer readable instruction stored on the computer readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer readable storage medium may include any tangible device capable of storing an instruction performed by an appropriate device, so that the computer readable storage medium having the instruction stored thereon constitutes a product including an instruction that may be performed in order to provide means for performing an operation specified by a flowchart or a block diagram. Examples of the computer readable storage medium may include an electronic storage medium, a magnetic storage medium, an optical storage medium, an electromagnetic storage medium, a semiconductor storage medium, and the like. More specific examples of computer readable storage media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, etc.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

The computer readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer readable instruction to provide means for performing operations specified by the flowchart or the block diagram. An example of the processor includes a computer processor, a processing unit, a microprocessor, a digital signal processor, a controller, a microcontroller, or the like.

According to the above described embodiment, the flight vehicle 100 has been used for the description as an example of the flight vehicle having the antenna which forms a wireless communication area on the ground by emitting the beam towards the ground to provide the wireless communication service to the user terminal in the wireless communication area, but is not limited to this. Examples of the flight vehicle include unmanned aerial vehicles such as a balloon, an airship, a plane, and a drone which can form the wireless communication area.

While the present invention has been described with the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: network; 30: user terminal; 40: gateway; 50: communications satellite; 60: satellite gateway; 100: flight vehicle; 102: feeder link; 104: beam; 110: multi-cell; 120: cell; 130: body section; 140: wing section; 150: solar panel; 160: HAPS; 162: cell; 164: cell; 166: cell; 170: HAPS; 172: cell; 174: cell; 176: cell; 200: flight control device; 300: communication control device; 400: control device; 402: connection count acquisition unit; 404: HO Out information acquisition unit; 406: HO In information acquisition unit; 408: output control unit; 410: notification unit; 500: management server; 510: information acquisition unit; 512: connection count acquisition unit; 514: HO Out information acquisition unit; 516: HO In information acquisition unit; 520: flight vehicle management unit; 522: output control unit; 524: notification unit; 1200: computer; 1210: host controller; 1212: CPU; 1214: RAM; 1216: graphics controller; 1218: display device; 1220: input/output controller; 1222: communication interface; 1224: storage device; 1230: ROM; 1240: input/output chip.

What is claimed is:

1. A control device which controls a flight vehicle which forms a multi-cell including a plurality of cells on a ground to provide a wireless communication service to user terminals in the multi-cell, the control device comprising:
   an output control unit which performs control such that in response to a state where a second flight vehicle which is to replace a first flight vehicle controlled by the control device has started forming a plurality of cells to be aligned with a position of each of the plurality of cells formed by the first flight vehicle, each of the plurality of cells formed by the second flight vehicle being in a same frequency band as that of each of the plurality of cells formed by the first flight vehicle, radio wave output of the plurality of cells of the first flight vehicle continuously falls, wherein
   the output control unit individually controls a decreasing speed of the radio wave output with regard to each of the plurality of cells, and
   the output control unit controls the decreasing speed of the radio wave output based on a number of connections of the user terminals with regard to each of the plurality of cells of the first flight vehicle.

2. The control device according to claim 1, comprising:
   a connection count acquisition unit which acquires the number of connections of the user terminals with regard to each of the plurality of cells of the first flight vehicle.

3. The control device according to claim 1, wherein the output control unit slows down the decreasing speed of the radio wave output as the number of connections of the user terminals is higher with regard to each of the plurality of cells of the first flight vehicle.

4. The control device according to claim 1, wherein the output control unit speeds up the decreasing speed of the radio wave output as the number of connections of the user terminals is lower with regard to each of the plurality of cells of the first flight vehicle.

5. The control device according to claim 1, comprising:
   an hand over out information acquisition unit which acquires hand over out information indicating a status of the user terminals handed over to be out with regard to each of the plurality of cells of the first flight vehicle, wherein
   the output control unit controls the decreasing speed of the radio wave output based on the hand over out information with regard to each of the plurality of cells of the first flight vehicle.

6. The control device according to claim 2, comprising:
   an hand over out information acquisition unit which acquires hand over out information indicating a status of the user terminals handed over to be out with regard to each of the plurality of cells of the first flight vehicle, wherein
   the output control unit controls the decreasing speed of the radio wave output based on the hand over out information with regard to each of the plurality of cells of the first flight vehicle.

7. The control device according to claim 5, wherein the hand over out information acquisition unit acquires the hand over out information indicating a number of the user terminals handed over to be out per unit time with regard to each of the plurality of cells of the first flight vehicle.

8. The control device according to claim 7, wherein the output control unit slows down the decreasing speed of the radio wave output as the number of the user terminals handed over to be out per unit time is higher with regard to each of the plurality of cells of the first flight vehicle.

9. The control device according to claim 1, comprising:
an hand over in information acquisition unit which acquires hand over in information indicating a status of the user terminals handed over to be in with regard to each of the plurality of cells of the second flight vehicle, wherein
the output control unit controls the decreasing speed of the radio wave output based on the hand over in information with regard to each of the plurality of cells of the first flight vehicle.

10. The control device according to claim 9, wherein the hand over in information acquisition unit acquires the hand over in information indicating a number of the user terminals handed over to be in per unit time with regard to each of the plurality of cells of the second flight vehicle.

11. The control device according to claim 10, wherein the output control unit slows down the decreasing speed of the radio wave output as the number of the user terminals handed over to be in per unit time to a cell in a corresponding position among the plurality of cells of the second flight vehicle is higher with regard to each of the plurality of cells of the first flight vehicle.

12. The control device according to claim 1, wherein the control device is arranged on the ground, and
the output control unit individually controls the decreasing speed of the radio wave output with regard to each of the plurality of cells by transmitting an instruction to the first flight vehicle.

13. The control device according to claim 1, wherein the control device is mounted to the first flight vehicle.

14. A non-transitory computer readable storage medium storing a program which causes a computer to function as a control device which controls a flight vehicle which forms a multi-cell including a plurality of cells on a ground to provide a wireless communication service to user terminals in the multi-cell, the control device comprising:
an output control unit which performs control such that in response to a state where a second flight vehicle which is to replace a first flight vehicle controlled by the control device has started forming a plurality of cells to be aligned with a position of each of the plurality of cells formed by the first flight vehicle, each of the plurality of cells formed by the second flight vehicle being in a same frequency band as that of each of the plurality of cells formed by the first flight vehicle, radio wave output of the plurality of cells of the first flight vehicle continuously falls, wherein
the output control unit individually controls a decreasing speed of the radio wave output with regard to each of the plurality of cells, and
the output control unit controls the decreasing speed of the radio wave output based on a number of connections of the user terminals with regard to each of the plurality of cells of the first flight vehicle.

15. A system comprising:
the control device according to claim 1;
the first flight vehicle; and
the second flight vehicle.

16. The system according to claim 15, wherein after moving to a position corresponding to the first flight vehicle which forms the plurality of cells, the second flight vehicle starts to form the plurality of cells each of which is in a same frequency band as that of each of the plurality of cells of the first flight vehicle.

17. The system according to claim 16, wherein the second flight vehicle transmits, to the control device, hand over in information indicating a status of the user terminals handed over to be in with regard to each of the plurality of cells.

18. A control method executed by a control device which controls a flight vehicle having an antenna which forms a multi-cell including a plurality of cells on a ground to provide a wireless communication service to user terminals in the multi-cell, the control method comprising:
controlling output by performing control such that in response to a state where a second flight vehicle which is to replace a first flight vehicle controlled by the control device has started forming a plurality of cells to be aligned with a position of each of the plurality of cells formed by the first flight vehicle, each of the plurality of cells formed by the second flight vehicle being in a same frequency band as that of each of the plurality of cells formed by the first flight vehicle, radio wave output of the plurality of cells of the first flight vehicle continuously falls, wherein
in the controlling the output, a decreasing speed of the radio wave output is individually controlled with regard to each of the plurality of cells, and
in controlling the output, the decreasing speed of the radio wave output is based on a number of connections of the user terminals with regard to each of the plurality of cells of the first flight vehicle.

19. A control device which controls a replacement flight vehicle which is to replace an active flight vehicle having an antenna which forms a multi-cell including a plurality of cells on a ground to provide a wireless communication service to user terminals in the multi-cell, the control device comprising:
a communication control unit which forms a plurality of cells to be aligned with a position of each of the plurality of cells formed by the active flight vehicle, each of the plurality of cells formed by the communication control unit being in a same frequency band as that of each of the plurality of cells formed by the active flight vehicle;
a notification unit which transmits, to the active flight vehicle, hand over in information indicating a status of the user terminals handed over to be in with regard to each of the plurality of cells formed by the communication control unit; and
an output control unit controls a decreasing speed of a radio wave output of at least one of the plurality of cells of the active flight vehicle based on a number of connections of the user terminals with the active flight vehicle.

* * * * *